United States Patent
Terado et al.

(10) Patent No.: US 6,528,617 B1
(45) Date of Patent: Mar. 4, 2003

(54) PROCESS FOR PRODUCING ALIPHATIC POLYESTER EXCELLENT IN STABILITY

(75) Inventors: Yuji Terado, Fukuoka (JP); Hiroshi Suizu, Tokyo (JP); Masatoshi Takagi, Chiba (JP); Masanobu Ajioka, Fukuoka (JP); Shoji Hiraoka, Yamaguchi (JP); Masayuki Sakai, Yamaguchi (JP); Hiroyuki Suzuki, Fukuoka (JP); Ryo Shinagawa, Fukuoka (JP); Shinji Ogawa, Fukuoka (JP); Yasushi Kotaki, Fukuoka (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/869,154

(22) PCT Filed: Oct. 27, 1999

(86) PCT No.: PCT/JP00/07555

§ 371 (c)(1),
(2), (4) Date: Jun. 25, 2001

(87) PCT Pub. No.: WO01/30883

PCT Pub. Date: May 3, 2001

(51) Int. Cl.$^7$ .................................................. C08F 6/00
(52) U.S. Cl. ....................................... 528/480; 528/481
(58) Field of Search ................................. 528/480, 481

(56) References Cited

FOREIGN PATENT DOCUMENTS

| EP | 0 953 589 A | | 11/1999 |
|---|---|---|---|
| EP | 1 153 954 A | | 11/2001 |
| JP | 8-269175 | | 10/1996 |
| JP | WO 200130883 | * | 8/2001 |
| WO | WO99/19378 | | 4/1999 |

* cited by examiner

Primary Examiner—Terressa M. Boykin
(74) Attorney, Agent, or Firm—Burns, Doane, Swecker & Mathis, LLP

(57) ABSTRACT

The invention relates to a process for producing an aliphatic polyester excellent in stability which includes subjecting an aliphatic polyester containing at least 50% of an aliphatic hydroxycarboxylic acid unit, obtainable by solid-phase polymerization under a flowing gas in the presence of a volatile catalyst so as to have a desired weight average molecular weight within the range of 50,000 to 1,000,000, to a heat treatment at a temperature equal to or higher than the reaction temperature of the solid-phase polymerization under a flowing gas with maintaining the aliphatic polyester in a solid state. According to the process of the invention, an aliphatic polyester excellent in stability at molding and storage stability is obtained.

17 Claims, No Drawings

PROCESS FOR PRODUCING ALIPHATIC POLYESTER EXCELLENT IN STABILITY

FIELD OF THE INVENTION

The present invention relates to a process for producing an aliphatic polyester excellent in stability having at least 50% of aliphatic hydroxycarboxylic acid units, which is a biodegradable polymer useful as a medical material or a substitute for general-purpose resins.

More precisely, the invention relates to a process for producing an aliphatic polyester excellent in stability, which comprises:

subjecting an aliphatic polyester containing at least 50% of an aliphatic hydroxycarboxylic acid unit, obtainable by solid-phase polymerization under a flowing gas in the presence of a volatile catalyst so as to have a desired weight average molecular weight within the range of 50,000 to 1,000,000, to a heat treatment at a temperature equal to or higher than the reaction temperature of the solid-phase polymerization under a flowing gas with maintaining the aliphatic polyester in a solid state.

BACKGROUND OF THE INVENTION

Associated with the environmental protection, waste disposal becomes a problem in these days. In particular, wastes of moldings and worked goods of general-purpose polymer materials are problematic in that, when buried for land reclamation, they will remain semi-permanently in the land as impurities, because they are lacking in ability to degrade or disintegrate by the action of microorganisms. In addition, additives such as plasticizer and others will be released out from them to pollute the environment.

Further, when the wastes are incinerated, there arise serious problems that the high combustion heat generated therefrom will damage furnaces and the exhaust fumes and gas from the combustion will cause air pollution, ozone layer destruction, global warming, acid rain, etc.

In that situation, there is an increasing demand for polymer materials which are tough but degradable when buried for land reclamation as wastes as well as produce low combustion heat that will not damage furnaces even when incinerated. However, polymer materials that satisfy the demand are not always available.

Polylactic acid which is one of aliphatic polyhydroxycarboxylic acids is highly transparent and tough, and has a characteristic that it is easily hydrolyzed in the presence of water. Therefore, when used as a general-purpose resin, it is friendly to the environment, since it is easily degraded without polluting the environment. In addition, when left in living bodies as a medical material, it is degraded :and absorbed in the bodies without harming the bodies after having accomplished its object as the medical material, and thus is gentle to living bodies. These excellent properties of polylactic acid have already been noticed prior to the present application.

Heretofore, the following technologies are disclosed as methods for modifying biodegradable polymers represented by polylactic acid and a copolymer of lactic acid and glycolic acid.

WO90/15629 discloses a technology of subjecting medical materials of a lactic acid polymer to a heat treatment at a temperature of 100° C. or more which is equal to or lower than the melting point of the lactic acid polymer with continuously discharging the gas in the system for at least 10 minutes. In that invention, the medical materials of the lactic acid polymer to be subjected to the heat treatment are in various forms such as filaments, strings, knittings, nonwoven cloths, woven cloths, and moldings. The heat treatment affords medical materials of the lactic acid polymer having an improved stability in living bodies and a sufficient strength that endures for a long period of time. However, in that invention, although the stability of the shaped products is improved in the bodies, there is no disclosure of the technology for improving the stability of the polymer before the molding process. Actually in Examples, the molecular weight of the polymer remarkably decreased after its spinning as compared to that before the spinning.

Moreover, Japanese Patent Laid-Open No. 231688/1996 discloses a process for producing polylactic acid which comprises a first step of obtaining polylactic acid by melt-polymerization using lactide as main starting material, a second step of pelletizing the polylactic acid polymerized and formed in the first step, a third step of solid-phase polymerization of the polylactic acid pellets obtained in the second step at a temperature lower than the melting point, and a fourth step of sublimating the monomer which remained in the polymerization of the third step.

There are, descriptions in the publication that "lactide and decomposed products thereof remarkably decrease the glass transition temperature and melt viscosity of the polymer, and also remarkably deteriorate the ability of molding and working as well as thermal stability thereof" and "a polylactic acid having a glass transition temperature of 55° C. or higher is obtained by removal of the unreacted monomers (lactide, lactic acid oligomers) by sublimation". Therefore, the improvement of thermal stability in the invention means the improvement of the glass transition temperature of polylactic acid, and this improvement is achieved by removal of lactide and lactic acid oligomers by sublimation. In Examples, there is disclosed polylactic acid wherein the content of lactide is reduced up to 5000 ppm by conducting the fourth step.

However, in the aliphatic polyester of the present invention, the content of lactide is 1000 ppm or less at the time before the heat treatment, and therefore the improvement of thermal stability resulted in by the heat treatment according to the invention is not achieved by removal of lactide.

Furthermore, when an extruded film is produced using polylactic acid containing much lactide, i.e., 5000 ppm or more, a lot of lactide vaporized is generated from the lip of the extruder to contaminate the film roll. This means that the roll should be cleaned regularly at the continuous production of the film. The inevitable cleaning shortens the continuous production period of time and renders the production inefficient. To the contrary, since polylactic acid before and after the heat treatment according to the present invention contains 1000 ppm or less of lactide, there is almost no possibility of contamination of the roll.

On the other hand, EP-953589A2 invented by the present inventors discloses a process for producing aliphatic polyesters having a weight average molecular weight of 50,000 to 1,000,000 and having at least 50% of an aliphatic hydroxycarboxylic acid unit, which comprises subjecting a crystallized, aliphatic polyester prepolymer having a weight average molecular weight of 2,000 to 100,000 and having at least 50% of an aliphatic hydroxycarboxylic acid unit, to solid-phase polymerization in the presence of a catalyst. It also describes the use of a volatile catalyst as the catalyst.

For obtaining an aliphatic polyester having a desired weight average molecular weight by solid-phase polymerization in the presence of a volatile catalyst, it is important to control the vaporization of the catalyst by the method, for example, controlling the flow rate of a flowing gas. However, in the case of using an organic sulfonic acid as the volatile catalyst, the aliphatic polyester containing the organic sulfonic acid in an amount of 50 to 300 ppm calculated as sulfur does not increase in weight average molecular weight through solid-phase polymerization, but has low stability.

Furthermore, EP-953589A2 also discloses a process of solid-phase polymerization with changing the reaction temperature, i.e., at two differentj temperatures raised stepwise. The polyactic acid obtained using an organic sulfonic acid as the catalyst causes decompositon when the reaction temperature is raised in the presence of the catalyst, whereby decomposed products are formed. Therefore, when polylactic acid containing such large amount of the organic sulfonic acid that the polymerization proceeds is obtained by solid-phase polymerization with the temperature raised, the yield of polyactic acid might be decreased through the acceleration of the decomposition. polylactic acrid containing such large amount of the organic sulfonic acid that the polymerization proceeds is obtained by solid-phase polymerization with the temperature raised, the yield of polylactic acid might be decrease through the acceleration of the decomposition.

Accordingly, the present invention is to provide a process for improving the stability of an aliphatic polyester such as polylactic acid obtainable by solid-phase polymerization in the presence of a volatile catalyst at molding and during storage, and also to provide an aliphatic polyester excellent in stability obtainable by the process.

SUMMARY OF THE INVENTION

As a result of the extensive studies for solving the above problems, the present inventors have been found that an aliphatic polyester excellent in stability is obtainable by subjecting an aliphatic polyester such as polylactic acid obtained after completion of solid-phase polymerization to treatment at a specific elevated temperature under a flowing gas, and thus accomplished the invention.

Namely, the invention is specified by the following aspects of [1] to [10].

[1] A process for producing an aliphatic polyester excellent in stability which comprises:

subjecting an aliphatic polyester containing at least 50% of an aliphatic hydroxycarboxylic acid unit, obtainable by solid-phase polymerization under a flowing gas in the presence of a volatile catalyst so as to have a desired weight average molecular weight within the range of 50,000 to 1,000,000, to a heat treatment at a temperature equal to or higher than the reaction temperature of the solid-phase polymerization under a flowing gas with maintaining the aliphatic polyester in a solid state.

[2] The process for producing an aliphatic polyester as described in. [1], wherein the volatile catalyst is an organic sulfonic acid.

[3] The process for producing an aliphatic polyester as described in [2], wherein the temperature at the heat treatment is from 140° C. to less than 170° C.

[4] The process for producing an aliphatic polyester as described in [1], wherein the flow rate of the gas is from 0.5 to 200 ml/minute per 1 g of the aliphatic polyester as described in [1].

[5] The process for producing an aliphatic polyester as described in [4], wherein the dew point of the gas is −20° C. or lower.

[6] The process for producing an aliphatic polyester as described in [2], wherein the content of the organic sulfonic acid contained in the aliphatic polyester before the heat treatment is from 50 to 300 ppm as a sulfur content, and the content of the organic sulfonic acid contained in the aliphatic polyester after the heat treatment is less than 50 ppm as a sulfur content.

[7] The process for producing an aliphatic polyester as described in [1] or [6], wherein the content of lactide contained in the aliphatic polyester before the heat treatment is 1000 ppm or less.

[8] The process for producing an aliphatic polyester as described in [1] or [7], wherein the aliphatic polyester containing at least 50% of an aliphatic hydroxycarboxylic acid unit is polylactic acid.

[9] The process for producing an aliphatic polyester as described in [1] or [7], wherein the aliphatic polyester containing at least 50% of an aliphatic hydroxycarboxylic acid unit is a star polymer comprising L-lactic acid, pentaerythritol and succinic acid, or a star polymer comprising L-lactic acid, trimethylolpropane and succinic acid.

[10] An aliphatic polyester excellent in stability, wherein the retentiveness of the molecular weight in pressing and/or the retentiveness of the molecular weight under hot and humid conditions of the aliphatic polyester produced by the method as described in [1] or [7] is 80% or more.

DETAILED DESCRIPTION OF PREFERRED EMBODIMENTS

The process of the invention comprises subjecting an aliphatic polyester containing at least 50% of an aliphatic hydroxycarboxylic acid unit, obtainable by solid-phase polymerization under a flowing gas in the presence of a volatile catalyst so as to have a desired weight average molecular weight within the range of 50,000 to 1,000,000, to a heat treatment at a temperature equal to or higher than the reaction temperature of the solid-phase polymerization under a flowing gas with maintaining the aliphatic polyester in a solid state.

The aliphatic polyester to be subjected to the heat treatment in the invention is obtained by solid-phase polymerization of an aliphatic polyester prepolymer containing at least 50% of an aliphatic hydroxycarboxylic acid unit and having a weight average molecular weight of 2,000 to 100,000, under a flowing gas in the presence of a volatile catalyst. Precisely, it can be produced using a volatile catalyst and an aliphatic polyester prepolymer described in the following in accordance with the method disclosed in EP-953589A2.

[Volatile Catalyst]

The volatile catalyst for use in solid-phase polymerization for the production of the aliphatic polyester to be: subjected to the heat treatment according to the invention is not particularly limited, so far as it meets the definition of the volatile catalyst described in EP-953589A2. Specifically, the catalyst may be an organic sulfonic acid, examples of which include alkanesulfonic acids having from 1 to 10 carbon atoms, such as methanesulfonic acid, ethanesulfonic acid, 1-propanesulfonic acid, 1-butanesulfonic acid, 1-pentanesulfonic acid, 1-hexanesulfonic acid, 1-heptanesulfonic acid, 1-octanesulfonic acid, 1-nonanesulfonic acid, 1-decanesulfonic acid, etc.; substituted alkanesulfonic acids such as trifluoromethanesulfonic acid, 3-hydroxypropanesulfonic acid, ethanedisulfonic acid, sulfoacetic acid, taurine, aminomethanesulfonic acid, etc.; benzenesulfonic acid and benzenesulfonic acid derivatives such as benzenesulfonic acid, p-toluenesulfonic acid, p-xylene-2-sulfonic acid, m-xylene-4-sulfonic acid, mesitylenesulfonic acid, p-chlorobenzenesulfonic acid, 2,5-dichlorobenzenesulfonic acid, o-nitrobenzenesulfonic acid, m-nitrobenzenesulfonic acid, p-nitrobenzenesulfonic acid, p-aminobenzenesulfonic acid, o-hydroxybenzenesulfonic acid, p-hydroxybenzenesulfonic acid, o-sulfobenzoic acid, etc.; naphthalenesulfonic acid and naphthalenesulfonic acid derivatives such as naphthalene-1-sulfonic acid, naphthalene-2-sulfonic acid, 1,5-naphthalenedisulfonic acid, 2,5-naphthalenedisulfonic acid, etc.; camphorsulfonic acid; and the like. Also, the acid anhydrides of these organic sulfonic acid can be employed. Of those, especially preferred are methanesulfonic acid, ethanesulfonic acid, 1-propanesulfonic acid, benzenesulfonic acid, p-toluenesulfonic acid, m-xylene-4-sulfonic acid, p-chlorobenzenesulfonic acid, and 2,5-dichlorobenzenesulfonic acid. These may be used singly or in combination of two or more.

The amount of the volatile catalyst to be used in the invention is not specifically defined, so far as the catalyst could substantially promote the reaction. The amount of the catalyst may be determined suitably, depending on the properties, such as the volatility and the acid strength, of the catalyst itself and on the reaction conditions. In general, the amount is preferably from 0.05 to 10% by weight of the aliphatic polyester to be produced, more preferably from 0.1 to 5% by weight in view of the economical aspect.

[Aliphatic Polyester Prepolymer]

The aliphatic polyester prepolymer for use in the production of the aliphatic polyester by solid-phase polymerization to be subjected to the heat treatment according to the invention, which contains at least 50% of an aliphatic hydroxycarboxylic acid unit, includes the following:

(1) Homopolymers or copolymers of aliphatic polyhydroxycarboxylic acids obtainable from aliphatic hydroxycarboxylic acids, or mixtures thereof;
(2) Copolymers of aliphatic polyhydroxycarboxylic acids with polyesters of aliphatic diols and aliphatic dibasic acids, or mixtures thereof;
(3) Copolymers of aliphatic polyhydroxycarboxylic acids with polysaccharide, or mixtures thereof;
(4) Copolymers of aliphatic polyhydroxycarboxylic acids, polysaccharides, and polyesters of aliphatic diols and aliphatic dibasic acids, or mixtures thereof;
(5) Star polymers comprising aliphatic hydroxycarboxylic acids, aliphatic polyols having at least 3 hydroxyl groups, and aliphatic polybasic acids having at least 2 carboxyl groups and/or anhydrides thereof; and
(6) Star polymers comprising aliphatic hydroxycarboxylic acids, aliphatic polybasic acids having at least 3 carboxyl groups and/or anhydrides thereof, and aliphatic polyols having at least 2 hydroxyl groups.

The aliphatic hydroxycarboxylic acids for producing the prepolymers of (1) to (6) are not particularly limited. Preferred specific examples thereof include lactic acid, as well as glycolic acid, 3-hydroxybutyric acid, 4-hydroxybutyric acid, 4-hydroxyvaleric acid, 5-hydroxyvaleric acid, 6-hydroxycaproic acid, etc. These hydroxycarboxylic acids may be used singly or in combination of two or more. The hydroxycarboxylic acids having an asymmetric carbon atom in the molecule like lactic acid, include D-form, L-form and their equimolar mixture (racemate), any of which is employable herein so far as the prepolymers to be obtained from them are crystalline. Above all, especially preferred is L-lactic acid to be produced through fermentation and having an optical purity of 95% or more, preferably 98% or more.

The aliphatic diols for producing the prepolymers of (2) and (4) are not particularly limited. Preferred specific examples thereof include ethylene glycol, diethylene glycol, triethylene glycol, propylene glycol, dipropylene glycol, 1,3-butanediol, 1,4-butanediol, 3-methyl-1,5-pentanediol, 1,6-hexanediol, 1,7-heptanediol, 1,8-octanediol, 1,9-nonanediol, neopentylglycol, 1,4-cyclohexanedimethanol, and the like. These may be used singly or in combination of two or more. The diols having an asymmetric carbon in the molecule may include D-forms, L-forms and their equimolar mixtures (racemates), any of which is employable herein.

The aliphatic dibasic acids for producing the prepolymers of (2) and (4) are not particularly limited. Specific examples of the aliphatic dibasic acids include aliphatic dicarboxylic acids such as succinic acid, oxalic acid, malonic acid, glutaric acid, adipic acid, pimelic acid, suberic acid, azelaic acid, sebacic acid, undecanedioic acid, dodecanedioic acid, 3,3-dimethylpentanedioic acid, etc.; and alicyclic dicarbocylic acids such as cyclohecanedicarboxylic acid, etc. These nay be used singly or in combination of two or more. The dibasic acids having an asymmetric carbon atom in the molecular may include D-forms, L-forms and their equimolar mixtures (racemates), any of which is employable herein.

The polysaccharides for producing the prepolymers of (3) are not particularly limited. Specific examples of the polysaccharides include cellulose, cellulose nitrate, cellulose acetate, methyl cellulose, ethyl cellulose, CMC (carboxymethyl cellulose), nitrocellulose, regenerated celluloses such as cellophane, viscose rayon, cupra, etc.; as well as hemicellulose, starch, amilopectin, dextrin, dextran, glycogen, pectin, chitin, chitosan, etc.; and their mixtures and derivatives. Of those, especially preferred are cellulose acetate, a cellulose ester, and ethyl cellulose, a cellulose ether.

The polysaccharides have a weight average molecular weight of preferably 3,000 or more, more preferably 10,000 or more. Also, the cellulose esters and the cellulose ethers have a degree of substitution of preferably 0.3 to 3.0, more preferably 1.0 to 2.8.

The aliphatic polyols having at least 2 hydroxyl groups for producing the prepolymers of (5) and (6) are not particularly limited. Specific examples of the aliphatic polyols having at least 2 hydroxyl groups include the aliphatic diols mentioned above, as well as glycerin, pentaerythritol, dipentaerythritol, trimethylolethane, trimethylolpropane, inositol, and the like. These may be used singly or in combination of two or more. The polyols having an asymmetric carbon atom in the molecule may include D-forms, L-forms and their equimolar mixtures (racemates), any of which is employable herein.

The aliphlatic polybasic acids having at least 2 carboxyl groups for producing the prepolymers of (5) and (6) are not particularly limited. Specific examples of the aliphatic polybasic acids having at least 2 carboxyl groups include the aliphatic dibasic acids mentioned above, as well as cyclic compounds such as 1,2,3,4,5,6-cyclohexanehexacarboxylic acid, 1,2,3,4-cyclopentanetetracarboxylic acid, tetrahydrofuran-2R, 3T, 4T, 5C-tetracarboxylic acid, 1,2,3,4-cyclobutane-tetracarboxylic acid, 4-carboxy-1,1-cyclohexanediacetic acid, 1,3,5-cyclohexanetricarboxylic acid, (1α, 3α, 5β)-1,3,5-trimethyl-1,3,5-cyclohexanetricarboxylic acid, 2,3,4,5-furantetracarboxylic acid, etc., and anhydrides thereof; linear compounds such as butane-1,2,3,4-tetracarboxylic acid, meso-butane-1,2,3,4-tetracarboxylic acid, 1,3,5-pentanetricarboxylic acid, 2-methylpropanetricarboxylic acid, 1,2,3-propanetricarboxylic acid, 1,1,2-ethanetricarbbxylic acid, 1,2,4-butanetricarboxylic acid, etc., and anhydrides thereof. These may be used singly or in combination of two or more. The polybasic acids having an asymmetric carbon atom in the molecule may include D-forms, L-forms and their equimolar mixtures (racemates), any of which is employable herein.

The prepolymers of (1), (5) and (6) can be obtained by dehydration polycondensation of aliphatic hydroxycarboxylic acids, or aliphatic hydroxycarboxylic acids with aliphatic polyols having at least 3 hydroxyl groups and aliphatic polybasic acids having at least 2 carboxyl groups, or aliphatic hydroxycarboxylic acids with aliphatic polybasic acids having at least 3 carboxyl groups and aliphatic polyols having at least 2 hydroxyl groups.

The prepolymers of (1), (2), (3) and (4) can be obtained, in the step of producing aliphatic polyhydroxycarboxylic acids by dehydration polycondensation of aliphatic hydroxycarboxylic acids, by mixing or copolymerizing the aliphatic hydroxycarboxylic acids with other aliphatic hydroxycarboxylic acids, with polyesters of aliphatic polyols and aliphatic polybasic acids, or with polysaccharides.

As the prepolymers to be used for solid-phase polymerization, preferred are the prepolymers of (1), (5) and (6). As the prepolymer (1), preferred is polylactic acid starting with lactic acid, and more preferred is poly L-lactic acid. As the prepolymer of (5), especially preferred is a star polymer comprising L-lactic acid, pentaerythritol, and succinic acid or a star polymer comprising L-lactic acid, trimethylolpropane and succinic acid.

In the prepolymers of (5) and (6), the composition of an aliphatic polyol having at least 3 hydroxyl groups and an aliphatic polybasic acid having at least 2 carboxyl groups and/or an acid anhydride thereof, or an aliphatic polybasic acid having at least 3 carboxyl groups and/or an acid anhydride thereof and an aliphatic polyol having at least 2 hydroxyl groups is as follows: Namely, the amount of the aliphatic polyol having at least 3 hydroxyl groups and the aliphatic polybasic acid having at least 3 carboxyl groups and/or the acid anhydride thereof, is from 0.005 to 10% by weight, preferably from 0.01 to 5% by weight based on the theoretical amount of a polymer resulting from complete homopolymerization of the aliphatic hydroxycarboxylic acid. And also, the equivalent ratio of the hydroxyl group to the carboxyl group in the aliphatic polyol having at least 3 hydroxyl groups and the aliphatic polybasic acid having at least 2 carboxyl groups and/or the acid anhydride thereof, or the equivalent ratio of the carboxyl group to the hydroxyl group in aliphatic polybasic acid having at least 3 carboxyl groups and/or the acid anhydride thereof and the aliphatic polyol having at least 2 hydroxyl groups is 100:50 to 200, preferably 100:80 to 120, more preferably 100:90 to 110.

[Aliphatic Polyester to be Subjected to a Heat Treatment]

In the invention, the aliphatic polyester to be subjected to the heat treatment is produced by solid-phase polymerization of the aliphatic polyester prepolymer in a presence of the volatile catalyst. The weight average molecular weight of the aliphatic polyester to be subjected to the heat treatment is preferably from 50,000 to 1,000,000, more preferably from 100,000 to 500,000 in the case of the polyester obtained by solid-phase polymerization of the prepolymer (1) or (2). In the case of the polyester obtained by solid-phase polymerization of any of the prepolymers (3) to (6), the molecular weight is preferably from 50,000 to 1,000, 000, more preferably from 100,000 to 500,000, further preferably 200,000 to 500,000.

Further, the aliphatic polyester to be subjected to the heat treatment is preferably in the form which maintains granular shape at the solid-polymerization. The heat treatment according to the invention is not applied to the polyester which is newly heated and molded after the solid-phase polymerization.

Furthermore, the content of lactide contained in the aliphatic polyester before the heat treatment according to the invention is 1000 ppm or less, preferably 500 ppm or less.

Moreover, in the heat treatment according to the invention, the weight average molecular weight of the aliphatic polyester does not substantially change before and after the heat treatment. The substantial no change of the weight average molecular weight herein means that the variation of the weight average molecular weight is within ±5%. The heat treatment according to the invention and the solid-phase polymerization are the same in view that heating is conducted in both operations, but they are different in that the weight average molecular weight is substantially not changed in one operation and is increased in the other operation. In the case that an organic sulfonic acid is used as the volatile catalyst, the content of the organic sulfonic acid contained in the aliphatic polyester is about 300 ppm or less calculated as sulfur in the case that the weight average molecular weight is not increased by the heat treatment, although the content sometimes varies with the heating temperature, the flow rate of the flowing gas, kind of the catalyst used, and the like. However, the aliphatic polyester is unstable when it contains remaining organic sulfonic acid in an amount of about 50 to 300 ppm calculated as sulfur, and therefore it is necessary to subject it to the heat treatment according to the invention.

[Heat treatment]

In the invention, the heat treatment means efficiently enhancing stability by heating the aliphatic polyester having a desired weight average molecular weight, obtained by solid-phase polymerization in the presence of a volatile catalyst, at a temperature equal to or higher than the reaction temperature of the solid-phase polymerization under a flowing gas with maintaining the polyester in a solid state. In the solid-phase polymerization, the vaporization of the catalyst is controlled so as to obtain an aliphatic polyester having a desired weight average molecular weight, but the catalyst is vaporized or deactivated in the heat treatment for enhancing stability actively. Accordingly, the purposes of the operations are quite different from each other.

[Stability]

The stability according to the invention includes thermal stability and storage stability. The thermal stability is evaluated by the change of the weight average molecular weight at the time when a pressed film is prepared from the aliphatic polyester after the heat treatment (hereinafter, referred to as retentiveness of molecular weight in pressing). The storage stability is evaluated by the change of the weight average molecular weight before and after the test of leaving the prepared pressed film under the conditions of a temperature of 50° C. and a humidity of 80% for 6 days (hereinafter, referred to as retentiveness of molecular weight under hot and humid conditions).

For obtaining a highly stable aliphatic polyester, it is necessary to contain less catalyst in the aliphatic polyester. Specifically, in the case of using an organic sulfonic acid as the catalyst, the content of the organic sulfonic acid contained in the aliphatic polyester should be 50 ppm or less calculated as sulfur.

This finding is first obtained through the establishment of quantitative analytical method of an organic sulfonic acid mentioned below (see Examples and the paragraph of measuring method of concentration of the organic sulfonic acid in aliphatic polyester). Namely, in EP-953589A2 submitted by the inventors, with regard to the content of the catalyst, the catalyst concentration, $C_A$ was only calculated from the sulfur concentration obtained by incinerating an aliphatic polyester into ash, absorbing the generated gas into 1% $H_2O_2$ solution, and determining a sulfur concentration quantitatively by ion chromatography, and therefore the organic sulfonic acid actually effective as catalyst was not determined.

Through the heat treatment according to the invention, any of the retentiveness of molecular weight in pressing and the retentiveness of molecular weight under hot and humid conditions is preferably 80% or higher, more preferably 90% or higher. In the case that the aliphatic polyester is polylactic acid, the mechanical strength such as tensile strengh, tensile modulus, and flexural strength remarkable lowers when the weight average molecular weight is decreased to 100,00 or less. Remarkable deterioration after molding into moldings or during storage may occur unless the weight average molecular weight of polylactic acid is 156,00 or more when both of the retentiveness of molecular weight in pressing and the retentiveness of molecular weight under hot and humid conditions are 80% or lower, or unless the weight average molecular weight of polylactic acid is 204,000 or more when both of the retentiveness of molecular weight in pressing and the retentiveness of molecular weight under hot humid conditions are 70% or lower. In other words, when the stability represented by the retentiveness of molecular weight in pressing and the retentiveness of molecular weight of the aliphatic polyester is not required, which results in an advantage that the time required for solid-state polymerization can be shortened.

[Temperature for Heat Treatment]

In the invention, the temperature for the heat treatment is not specifically defined, so far as the aliphatic polyester is substantially maintained in a solid state and the temperature is equal to or higher than the reaction temperature of the solid-phase polymerization of the aliphatic polyester prepolymer. In general, the higher temperature for the heat treatment is preferred in view of the efficient vaporization or deactivation of catalyst. The temperature for the heat treatment is preferably from 140° C. to less than 170° C., more preferably from 150° C. to 160° C. In the case that the aliphatic polyester is polylactic acid, the temperature for the heat treatment of 170° C. or higher is not preferred because coloring occurs besides the molecular weight is decreased.

[Flowing Gas]

Specific examples of the flowing gas, i.e., the gas flowed in the reaction system, to be used in the heat treatment according to the invention include inert gases such as nitrogen gas, helium gas, argon gas, xenon gas, krypton gas, etc.; dry air and the like. Above all, preferred are inert gases such as nitrogen gas.

It is preferable that the water content of the flowing gas is as small as possible, and preferably, the flowing gas contains substantially no water. Too much water content of the flowing gas is not preferred because the weight average molecular weight of the aliphatic polyester is sometimes lowered during the heat treatment. In this case, the flowing gas to be used may be previously passed through the layer filled with molecular sieves or ion exchange resins or the like so as to remove water. Where the water content of the flowing gas is indicated by the dew point thereof, it is preferable that the dew point of the gas is −20° C. or lower, more preferably −50° C. or lower.

The flow rate of the gas flowed in the heat treatment is not specifically defined, so far as the catalyst is efficiently vaporized. The flow rate may be suitably determined in consideration of the heating temperature. It is preferable to determine the flow rate of the flowing gas higher than that in the case of solid-phase polymerization because it is unnecessary to increase the molecular weight. In general, larger flow rate may enhance the stability efficiently. Actually, the flow rate of the flowing gas is preferably from 0.5 to 200 ml/minute, per 1 g of the aliphatic polyester, more preferably from 1.0 to 100 ml/minute, further preferably from 1.67 to 50 ml/minute. When represented by linear velocity, the velocity is preferably from 0.01 to 500 cm/second. [Molding and working methods of aliphatic polyesters according to the invention and their applications]

The aliphatic polyesters of the invention thus obtained are suitably employed for molding and working methods, for example, injection molding, extrusion molding, inflation molding, extrusion blow molding, foaming, calender molding, blow molding, balloon molding, vacuum molding, spinning, etc.

The aliphatic polyesters of the invention are suitably employed for medical applications and food wrapping applications which, prior to the present application, have heretofore been known and employed, and as substitutes for general-purpose resins.

The aliphatic polyesters can be used, through any suitable molding and working methods, for example, as parts for writing materials such as ball-point pens, automatic pencils, pencils and others, parts for stationery, golf tees, parts for smoke golf balls for first ball shooting ceremonies, capsules for oral medicines, carriers for anal and vaginal suppositories, carriers for plasters to the skin and mucous membranes, capsules for agricultural chemicals, capsules for fertilizers, capsules for seeds and seedlings, composts, reels for fishing lines, floats for fishing, decoys for fishery, lures, buoys for fishery, decoys for hunting, capsules for hunting shots, camping goods such as dishes and others, nails, piles, binders, nonskid materials for muddy places and snow roads, blocks, lunch boxes, tableware, container for packed lunches and everyday dishes such as those sold in convenience stores, chopsticks, half-split disposable chopsticks, folks, spoons, skewers, toothpicks, cups for cupped instant noodles, cups for automatic drink machines, containers and trays for foods such as fishes, meats, vegetables, bean-curd cakes, everyday dishes and others, fish boxes to be used in fish markets, bottles for milk products such as milk, yogurt, lactic acid bacteria beverages and others, bottles for soft drinks such as carbonated beverages, cooling beverages and others, bottles for alcohol drinks such as beer, whisky and others, pumping or non-pumping bottles for shampoo and liquid soap, tubes for toothpaste, containers for cosmetics, containers for detergents, containers for bleaching agents, cooling boxes, flowerpots, casings for water-purifying cartridges, casings for artificial kidneys, artificial livers and others, parts for syringes, buffers to be used for transporting domestic electrical appliances such as TVs, stereo record players and others, buffers to be used for transporting precision instruments such as computers, printers, clocks and others, buffers to be used for transporting ceramic products such as glassware, earthenware and others.

EXAMPLES

The invention is described in detail with reference to the following Examples. Examples described in this specification are explanations to support the good understanding of the contents of the invention and are not intended to restrict the technical scope of the invention.

The evaluation methods employed in Examples are as follow:

(1) Weight Average Molecular Weight

The weight average molecular weight (Mw) of the aliphatic polyester polymer obtained was measured by gel permeation chromatography (at a column temperature of 40° C., using chloroform as the solvent), while being compared with the molecular weights of standard samples of polystyrene.

2) Catalyst Concentration in Aliphatic Polyester (Sulfur Concentration)

The catalyst concentration in aliphatic polyester (sulfur concentration) was determined by ion chromatography. Namely, a sample was heated to 900° C. in a closed system ($Ar/O_2$), whereupon the gas generated during the ashing was absorbed into a predetermined amount of an absorbent liquid (1% $H_2O_2$ solution), and analyzed by ion chromatography. For ion chromatographic measurement, used was Ion Chromatograph DX-300 Model manufactured by Dionex.

The catalyst concentration, $C_A$ is a calculated value derived from the sulfur concentration obtained according to the present measurement.

3) Concentration of Organic Sulfonic Acid in Aliphatic Polyester

The concentration of the organic sulfonic acid in the aliphatic polyester was determined by high performance liquid chromatography connected to the detector of an electric conductometer. Namely, after dissolution of a sample in chloroform, an organic sulfonic acid was extracted with a mixed solvent of acetonitrile/water and then was quantitatively determined by high performance liquid chromatography connected to the detector of an electric conductometer.

4) Thermal Stability

The thermal stability was evaluated by the retentiveness of weight average molecular weight in pressing. The retentiveness of weight average molecular weight in pressing was calculated from the ratio of the weight average molecular weight of the sample after the formation of a hot-pressed film at 190° C. relative to that of the sample before the formation.

The hot-pressed film was prepared by drying an aliphatic polyester in vacuum at 60° C. for 5 hours, heating at a temperature of 190° C. for 3 minutes, and pressing under a pressure of 10 MPa for 1 minute, the heating time being 4 minutes in total, whereby a film having a thickness of 100 $\mu$m was obtained.

5) Stability During Storage

The stability during storage was evaluated by the retentiveness of weight average molecular weight under hot and humid conditions.

The pressed film prepared in the precedent paragraph was left under the conditions of a temperature of 50° C. and a humidity of 80% for 6 days. The retentiveness was calculated from the ratio of the weight average molecular weight after the test relative to that before the test.

[Production Examples of Aliphatic Polyesters to be Subjected to a Heat Treatment]

Production Example 1

Into a 500 ml round-bottom flask were fed 102.3 g of 88% L-lactic acid and 0.72 g of methanesulfonic acid. Then, the whole was heated from room temperature up to 160° C. over a period of 1 hour in a nitrogen atmosphere under normal pressure, and kept at 160° C. for 1 hour. Thereafter, the pressure was gradually reduced from normal pressure to 10 mmHg over a period of 2 hours with keeping the temperature at 160° C. Finally, the reaction was continued at 160° C./10 mmHg for 8 hours. The product formed in this stage had a weight average molecular eight of 13,000.

Thereafter, the reaction mixture was poured into an enamel vat, and cooled to 30° C. to obtain 67.0 g (yield: 93.1%) of a prepolymer. The resulting prepolymer was ground in a mortar and sieved to obtain a granular prepolymer having particle size of 0.5 to 2 mm. Into 120 g of water of 50° C. was fed 30 g of the granular prepolymer, and then left on standing for 60 minutes to cause crystallization. After drying, 25.00 g of the prepolymer was weighed and put into a vertical SUS reactor. Then, the prepolymer was subjected to solid-phase polymerization in an air drier under the following reaction conditions:

(1) at 120° C. under nitrogen gas flow (nitrogen flow rate: 25 ml/minute) for 10 hours, and (2) at 140° C. under nitrogen gas flow (nitrogen flow rate: 25 ml/minute) for 60 hours.

Thereby, 23.75 g (yield: 95.0%) of polylactic acid was obtained.

The dew point of the nitrogen gas used herein was 60° C.

The properties of the aliphatic polyester obtained by the solid-phase polymerization are as follows:

Weight average molecular weight (Mw): 130,000

Catalyst concentration, $C_A$: 360 ppm (sulfur content on analysis: 120 ppm)

Concentration of the organic sulfonic acid: 180 ppm (value calculated as sulfur: 60 ppm)

Retentiveness of molecular weight in pressing: 72%

Retentiveness of molecular weight during hot and humid conditions: 65%.

Production Example 2

Into a 500 ml round-bottom flask were fed 102.3 g of 88% L-lactic acid and 0.80 g of p-toluenesulfonic acid monohydrate. Then, the whole was heated from room temperature up to 160° C. over a period of 1 hour in a nitrogen atmosphere under normal pressure, and kept at 160° C. for 1 hour. Thereafter, the pressure was gradually reduced from normal pressure to 10 mmHg over a period of 2 hours with keeping the temperature at 160° C. Finally, the reaction was continued at 160°/10 mmHg for 8 hours, The product formed in this stage had a weight average molecular weight of 13,300.

Thereafter, the reaction mixture was poured into an enamel vat, and cooled to 30° C. to obtain 67.7 g (yield: 94.0%) of a prepolymer. The resulting prepolymer was ground in a mortar and sieved to obtain a granular prepolymer having particle size of 0.5 to 2 mm. Into 120 g of water of 50° C. was fed 30 g of the granular prepolymer, and then left on standing for 60 minutes to cause crystallization. After drying, 25.00 g of the prepolymer was weighed and put into a vertical SUS reactor. Then, the prepolymer was subjected to solid-phase polymerization in an air drier under the following reaction conditions:

(1) at 120° C. under nitrogen gas flow (nitrogen flow rate: 2000 ml/minute) for 10 hours, and (2) at 140° C. under nitrogen gas flow (nitrogen flow rate: 2000 ml/minute) for 60 hours.

Thereby, 23.80 g (yield: 95.2%) of polylactic acid was obtained.

The dew point of the nitrogen gas used herein was −60° C.

The properties of the aliphatic polyester obtained by the solid-phase polymerization are as follows:

Weight average molecular weight (Mw): 136,000

Catalyst concentration, $C_A$: 914 ppm (sulfur content on analysis: 170 ppm)

Concentration of the organic sulfonic acid: 320 ppm (value calculated as sulfur: 60 ppm)

Retentiveness of molecular weight in pressing: 72%

Retentiveness of molecular weight during hot and humid conditions: 63%.

Production Example 3

Into a 500 ml round-bottom flask were fed 102.3 g of 88% L-lactic acid and 0.72 g of methanesulfonic acid. Then, the whole was heated from room temperature up to 160° C. over a period of 1 hour in a nitrogen atmosphere under normal pressure, and kept at 160° C. for 1 hour. Thereafter, the pressure was gradually reduced from normal pressure to 10 mmHg over a period of 2 hours with keeping the temperature at 160° C. Finally, the reaction was continued at 160° C./10 mmHg for 8 hours. The product formed in this stage had a weight average molecular weight of 13,000.

Thereafter, the reaction mixture was poured into an enamel vat, and cooled to 30° C. to obtain 67.0 g (yield: 93.1%) of a prepolymer. The resulting prepolymer was ground in a mortar and sieved to obtain a granular prepolymer having particle size of 0.5 to 2 mm. Into 120 g of water of 50% was fed 30 g of the granular prepolymer, and then left on standing for 60 minutes to cause crystallization. After drying, 25.00 g of the prepolymer was weighed and put into a vertical SUS reactor. Then, the prepolymer was subjected to solid-phase polymerization in an air drier under the following reaction conditions:

(1) at 120° C. under nitrogen gas flow (nitrogen flow rate: 15 ml/minute) for 10 hours, and (2) at 140° C. under nitrogen gas flow (nitrogen flow rate: 15 ml/minute) for 60 hours.

Thereby, 23.83 g (yield: 95.3%) of polylactic acid was obtained.

The dew point of the nitrogen gas used herein was −60° C.

The properties of the aliphatic polyester obtained by the solid-phase polymerization are as follows:

Weight average molecular weight (Mw): 166,000

Catalyst concentration, $C_A$: 960 ppm (sulfur content on analysis: 320 ppm)

Concentration of the organic sulfonic acid: 600 ppm (value calculated as sulfur: 200 ppm)

Retentiveness of molecular weight in pressing: 59%

Retentiveness of molecular weight during hot and humid conditions: 45%.

Production Example 4

Into a 500 ml round-bottom flask were fed 102.3 g of 88% L-lactic acid and 0.51 g of methanesulfonic acid. Then, the whole was heated from room temperature up to 160° C. over a period of 1 hour in a nitrogen atmosphere under normal pressure, and kept at 160° C. for 1 hour. Thereafter, the pressure was gradually reduced from normal pressure to 10 mmHg over a period of 2 hours with keeping the temperature at 160° C. Finally, the reaction was continued at 160° C./10 mmHg for 8 hours. The product formed in this stage had a weight average molecular weight of 11,000.

Thereafter, the reaction mixture was poured into an enamel vat, and cooled to 30° C. to obtain 66.3 g (yield: 92.1%) of a prepolymer. The resulting prepolymer was ground in a mortar and sieved to obtain a granular prepolymer having particle size of 0.5 to 2 mm. Into 120 g of water of 50° C. was fed 30 g of the granular prepolymer, and then left on standing for 60 minutes to cause crystallization. After drying, 24.00 g of the prepolymer was weighed and put into a vertical SUS reactor. Then, the prepolymer was subjected to solid-phase polymerization in an air drier under the following reaction conditions:

(1) at 120° C. under nitrogen gas flow (nitrogen flow rate: 20 ml/minute) for 10 hours, and (2) at 140° C. under nitrogen gas flow (nitrogen flow rate: 20 ml/minute) for 60 hours.

Thereby, 22.85 g (yield: 95.2%) of polylactic acid was obtained.

The dew point of the nitrogen gas used herein was −60° C.

The properties of the aliphatic polyester obtained by the solid-phase polymerization are as follows:

Weight average molecular weight (Mw): 155,000

Catalyst concentration, $C_A$: 810 ppm (sulfur content on analysis: 270 ppm)

Concentration of the organic sulfonic acid: 400 ppm (value calculated as sulfur: 133 ppm)

Retentiveness of molecular weight in pressing: 65%.

Example 1

A 6.00 g portion of the aliphatic polyester (polylactic acid) of Production Example 1 was put into a vertical SUS reactor, and subjected to a heat treatment in an air drier at 150° C. under nitrogen gas flow (nitrogen flow rate: 10 ml/minute) for 40 hours.

Weight average molecular weight (Mw): 130,000

Catalyst concentration, $C_A$: 330 ppm (sulfur content on analysis: 110 ppm)

Concentration of the organic sulfonic acid: 90 ppm (value calculated as sulfur: 30 ppm)

Retentiveness of molecular weight in pressing: 93%

Retentiveness of molecular weight during hot and humid conditions: 91%.

Example 2

A 6.00 g portion of the aliphatic polyester (polylactic acid) of Production Example 1 was put into a vertical SUS reactor, and subjected to a heat treatment in an air drier at 155° C. under nitrogen gas flow (nitrogen flow rate: 10 ml/minute) for 40 hours.

Weight average molecular weight (Mw): 130,000

Catalyst concentration, $C_A$: 330 ppm (sulfur content on analysis: 110 ppm)

Concentration of the organic sulfonic acid: 90 ppm (value calculated as sulfur: 30 ppm)

Retentiveness of molecular weight in pressing: 93%

Retentiveness of molecular weight during hot and humid conditions: 91%.

Example 3

A 6.00 g portion of the aliphatic polyester (polylactic acid) of Production Example 1 was put into a vertical SUS reactor, and subjected to a heat treatment in an air drier at 160° C. under nitrogen gas flow (nitrogen flow rate: 10 ml/minute) for 40 hours.

Weight average molecular weight (Mw): 130,000

Catalyst concentration, $C_A$: 300 ppm (sulfur content on analysis: 100 ppm)

Concentration of the organic sulfonic acid: 60 ppm (value calculated as sulfur: 20 ppm)

Retentiveness of molecular weigh in pressing: 94%

Retentiveness of molecular weigh during hot and humid conditions: 92%.

Example 4

A 5.00 g portion of the aliphatic polyester (polylactic acid) of Production Example 2 was put into a vertical SUS reactor, and subjected to a heat treatment in an air drier at 150° C. under nitrogen gas flow (nitrogen flow rate: 200 ml/minute) for 40 hours.

Weight average molecular weight (Mw): 136,000

Catalyst concentration, $C_A$: 914 ppm (sulfur content on analysis: 170 ppm)

Concentration of the organic sulfonic acid: 160 ppm (value calculated as sulfur: 30 ppm)

Retentiveness of molecular weight in pressing: 93%

Retentiveness of molecular weight during hot and humid conditions: 90%.

Example 5

A 5.00 g portion of the aliphatic polyester (polylactic acid) of Production Example 2 was put into a vertical SUS reactor, and subjected to a heat treatment in an air drier at 155° C. under nitrogen gas flow (nitrogen flow rate: 200 ml/minute) for 40 hours.

Weight average molecular weight (Mw): 136,000

Catalyst concentration, $C_A$: 860 ppm (sulfur content on analysis: 160 ppm)

Concentration of the organic sulfonic acid: 160 ppm (value calculated as sulfur: 30 ppm)

Retentiveness of molecular weight in pressing: 93%

Retentiveness of molecular weight during hot and humid conditions: 90%.

Example 6

A 5.00 g portion of the aliphatic polyester (polylactic acid) of Production Example 2 was put into a vertical SUS reactor, and subjected to a heat treatment in an air drier at 160° C. under nitrogen gas flow (nitrogen flow rate: 200 ml/minute) for 40 hours.

Weight average molecular weight (Mw): 136,000

Catalyst concentration, $C_A$: 860 ppm (sulfur content on analysis: 160 ppm)

Concentration of the organic sulfonic acid: 160 ppm (value calculated as sulfur: 30 ppm)

Retentiveness of molecular weight in pressing: 94%

Retentiveness of molecular weight during hot and humid conditions: 90%.

Example 7

A 6.00 g portion of the aliphatic polyester (polylactic acid) of Production Example 3 was put into a vertical SUS reactor, and subjected to a heat treatment in an air drier at 150° C. under nitrogen gas flow (nitrogen flow rate: 50 ml/minute) for 40 hours.

Weight average molecular weight (Mw): 166,000

Concentration of the organic sulfonic acid: 90 ppm (value calculated as sulfur: 30 ppm)

Retentiveness of molecular weight in pressing: 93%

Retentiveness of molecular weight during hot and humid conditions: 91%.

Example 8

A 6.00 g portion of the aliphatic polyester (polylactic acid) of Production Example 3 was put into a vertical SUS reactor, and subjected to a heat treatment in an air drier at 155° C. under nitrogen gas flow (nitrogen flow rate: 50 ml/minute) for 40 hours.

Weight average molecular weight (Mw): 166,000

Concentration of the organic sulfonic acid: 90 ppm (value calculated.as sulfur: 30 ppm)

Retentiveness of molecular weight in pressing: 93%

Retentiveness of molecular weight during hot and humid conditions: 91%.

Example 9

A 6.00 g portion of the aliphatic polyester (polylactic acid) of Production Example 3 was put into a vertical SUS reactor, and subjected to a heat treatment in an air drier at 160° C. under nitrogen gas flow (nitrogen flow rate: 50 ml/minute) for 40 hours.

Weight average molecular weight (Mw): 166,000.

Concentration of the organic sulfonic acid: 60 ppm (value calculated as sulfur: 20 ppm)

Retentiveness of molecular weight in pressing: 94%

Retentiveness of molecular weight during hot and humid conditions: 92%.

Example 10

A 6.00 g portion of the aliphatic polyester (polylactic acid) of Production Example 4 was put into a vertical SUS reactor, and subjected to a heat treatment in an air drier at 140° C. under nitrogen gas flow (nitrogen flow rate: 40 ml/minute) for 24 hours.

Weight average molecular weight (Mw): 155,000

Catalyst concentration, $C_A$: 330 ppm (sulfur content on analysis: 110 ppm)

Concentration of the organic sulfonic acid: 100 ppm (value calculated as sulfur: 33 ppm)

Retentiveness of molecular weight in pressing: 92%.

Example 11

A 6.00 g portion of the aliphatic polyester (polylactic acid) of Production Example 4 was put into a vertical SUS reactor, and subjected to a heat treatment in an air drier at: 160° C. under nitrogen gas flow (nitrogen flow rate: 40 ml/minute) for 10 hours.

Weight average molecular weight (Mw): 155,000

Catalyst concentration, $C_A$: 330 ppm (sulfur content on analysis: 110 ppm)

Concentration of the organic sulfonic acid: 100 ppm (value calculated as sulfur: 33 ppm)

Retentiveness of molecular weight in pressing: 93%.

Comparative Example 1

Retentiveness of molecular weight in pressing and retentiveness of molecular weight during hot and humid conditions of the aliphatic polyester (polylactic acid) of Production Example 1 without the heat treatment were found to be 72% and 65%, respectively.

Comparative Example 2

Retentiveness of molecular weight in pressing and retentiveness of molecular weight during hot and humid conditions of the aliphatic polyester (polylactic acid) of Production Example 2 without the heat treatment were found to be 72% and 63%, respectively.

Comparative Example 3

Retentiveness of molecular weight in pressing and retentiveness of molecular weight during hot and humid conditions of the aliphatic polyester (polylactic acid) of Production Example 3 without the heat treatment were found to be 59% and 45%, respectively.

Comparative Example 4

Retentiveness of molecular weight in pressing of the aliphatic polyester (polylactic acid) of Production Example 4 without the heat treatment was found to be 65%.

Comparative Example 5

A 6.00 g portion of the aliphatic polyester (polylactic acid) of Production Example 1 was put into a vertical SUS reactor, and subjected to a heat treatment in an air drier at 170° C. under nitrogen gas flow (nitrogen flow rate: 10 ml/minute) for 40 hours.

Weight average molecular weight (Mw): 118,000

This example shows that the heat treatment at 170° C. causes the decrease of weight average molecular weight through the decomposition of polylactic acid during the heat treatment owing to the presence of the volatile catalyst when the aliphatic polyester is polylactic acid.

Comparative Example 6

A prepolymer obtained by using 0.28 g (0.08% by weight relative to lactic acid) of tin powder as the catalyst and having a weight average molecular weight of 12,000 was put into a vertical SUS reactor. After crystallization, the prepolymer was subjected to solid-phase polymerization at a reaction temperature of 140° C. under nitrogen gas flow (nitrogen flow rate: 200 ml/minute) for a period of 60 hours to obtain 4.46 g (yield: 89.2%) of an aliphatic polyester (polylactic acid) having a weight average molecular weight of 132,000.

Then, a 4.00 g portion of the aliphatic polyester (polylactic acid) thus obtained was again put into a vertical SUS reactor, and subjected to a heat treatment at 150° C. under nitrogen gas flow (nitrogen flow rate: 200 ml/minute) for 40 hours to obtain 3.19 g (yield: 79.8%) of an aliphatic polyester (polylactic acid).

The dew point of the nitrogen gas used herein was −60° C.

The properties of the aliphatic polyester obtained by the heat treatment are as follows:

By the way, the catalyst concentration (tin concentration) was determined quantitatively by fluorescent X-ray analysis.

Weight average molecular weight (Mw): 208,000

Catalyst concentration (tin concentration), $C_A$: 1200 ppm

Residual rate of the catalyst, R: 100%

Retentiveness of molecular weight in pressing: 38%.

The catalyst amount was not decreased by the heat treatment and the polymerization proceeded, but the yield was lowered partly because of the formation of lactide.

Comparative Example 7

A 5.00 g portion of a prepolymer obtained by using 3.11 g (0.8% by weight relative to lactic acid) of p-toluenesulfonic acid monohydrate as the catalyst and having a weight average molecular weight of 13,000 was put into a vertical SUS reactor. After crystallization, the prepolymer was subjected to the following two-step solid-phase polymerization:

First step: reaction pressure, 760 mmHg; reaction temperature, 140° C.; flow rate of flowing gas (nitrogen gas), 5 ml/minute; reaction time, 40 hours;

Second step: reaction pressure, 760 mmHg; reaction temperature, 160° C.; flow rate of flowing gas (nitrogen gas), 200 ml/minute; reaction time, 60 hours.

The weight average molecular weight of polylactic acid after each predetermined period of time is as follows:

Weight average molecular weight of the prepolymer at the start of the solid-phase polymerization: 13,000

Weight average molecular weight of the prepolymer 40 hours after the start of the solid-phase polymerization: 92,000

Weight average molecular weight of the prepolymer 100 hours after the start of the solid-phase polymerization: 146,000.

As evident from the above results, the weight average molecular weight was increased by 79,000 at the first step and by 54,000 at the second step. Accordingly, the processes at the first and second steps are considered to be solid-phase polymerization as defined in EP-953589A2 and the second step is not a step of the heat treatment according to the present invention.

Industrial Applicability

The aliphatic polyesters obtainable according to the invention and excellent in stability are suitably employed for molding and working methods, for example, injection molding, extrusion molding, inflation molding, extrusion blow molding, foaming, calender molding, blow molding, balloon molding, vacuum molding, or spinning. They are also suitably employed for medical applications and food wrapping applications which, prior to the present application, have heretofore been known and employed, and as substitutes for general-purpose resins.

What is claimed is:

1. A process for producing an aliphatic polyester excellent in stability which comprises:

heating an aliphatic polyster containing at least 50% of an aliphatic hydroxycarboxylic acid unit, produced by solid-phase polymerization under a flowing gas in the presence of a volatile catalyst so as to have a desired weight average molecular weight within the range of 50,000 to 1,000,000, at a temperature equal to or higher than the reaction temperature of the solid-phase polymerization under a flowing gas with maintaining the aliphatic polyster in a solid state.

2. The process for producing an aliphatic polyester excellent in stability according to claim 1, wherein the volatile catalyst is an organic sulfonic acid.

3. The process for producing an aliphatic polyester excellent in stability according to claim 2, wherein the heating temperature is from 140° C. to less than 170° C.

4. The process for producing an aliphatic polyester excellent in stability according to claim 1, wherein the flow rate of the gas is from 0.5 to 200 ml/minute per 1 g of the aliphatic polyester according to claim 1.

5. The process for producing an aliphatic polyester excellent in stability according to claim 4, wherein the dew point of the gas is −20° C. or lower.

6. The process for producing an aliphatic polyester excellent in stability according to claim 2, wherein the content of the organic sulfonic acid contained in the aliphatic polyster before heating is from 50 to 300 ppm as a sulfur content, and the content of the organic sulfonic acid contained in the aliphatic polyster after heating is less than 50 ppm as a sulfur content.

7. The process for producing an aliphatic polyester excellent in stability according to claim 6, wherein the content of lactide contained in the aliphatic polyster before heating is 1000 ppm or less.

8. The process for producing an aliphatic polyester excellent in stability according to claim 7, wherein the aliphatic polyester containing at least 50% of an aliphatic hydroxycarboxylic acid unit is polylactic acid.

9. The process for producing an aliphatic polyester excellent in stability according to claim 7, wherein the aliphatic polyester containing at least 50% of an aliphatic hydroxycarboxylic acid unit is a star polymer comprising L-lactic acid and pentaerythritol and succinic acid, or a star polymer comprising L-lactic acid and trimethylolpropane and succinic acid.

10. An aliphatic polyester excellent in stability, wherein the retentiveness of the molecular weight in pressing and/or the retentiveness of the molecular weight under hot and humid conditions of the aliphatic polyester produced by the method according to claim 7 is 80% or more.

11. The process for producing an aliphatic polyester excellent in stability according to claim 1, wherein the content of lactide contained in the aliphatic polyster before heating is 1000 ppm or less.

12. The process for producing an aliphatic polyester excellent in stability according to claim 11, wherein the aliphatic polyester containing at least 50% of an aliphatic hydroxycarboxylic acid unit is polylactic acid.

13. The process for producing an aliphatic polyester excellent in stability according to claim 1, wherein the aliphatic polyester containing at least 50% of an aliphatic hydroxycarboxylic acid unit is polylactic acid.

14. The process for producing an aliphatic polyester excellent in stability according to claim 11, wherein the aliphatic polyester containing at least 50% of an aliphatic hydroxycarboxylic acid unit is a star polymer comprising L-lactic acid and pentaerythritol and succinic acid, or a star polymer comprising L-lactic acid and trimethylolpropane and succinic acid.

15. The process for producing an aliphatic polyester excellent in stability according to claim 1, wherein the aliphatic polyester containing at least 50% of an aliphatic hydroxycarboxylic acid unit is a star polymer comprising L-lactic acid and pentaerythritol and succinic acid, or a star polymer comprising L-lactic acid and trimethylolpropane and succinic acid.

16. An aliphatic polyester excellent in stability, wherein the retentiveness of the molecular weight in pressing and/or the retentiveness of the molecular weight under hot and humid conditions of the aliphatic polyester produced by the method according to claim 11 is 80% or more.

17. An aliphatic polyester excellent in stability, wherein the retentiveness of the molecular weight in pressing and/or the retentiveness of the molecular weight under hot and humid conditions of the aliphatic polyester produced by the method according to claim 1 is 80% or more.

* * * * *

UNITED STATES PATENT AND TRADEMARK OFFICE
CERTIFICATE OF CORRECTION

PATENT NO. : 6,528,617 B1
DATED : March 4, 2003
INVENTOR(S) : Yuji Terado et al.

It is certified that error appears in the above-identified patent and that said Letters Patent is hereby corrected as shown below:

<u>Title page,</u>
Item [22], PCT Filed, please change "Oct. 27, 1999" to -- Oct. 27, 2000 --.
Please insert:
-- [30] Foreign Application Priority Data
10/27/1999 (JP) 11-305947 --.

Signed and Sealed this

Second Day of March, 2004

JON W. DUDAS
*Acting Director of the United States Patent and Trademark Office*